March 2, 1971  G. L. BABER  3,567,264
IMPLEMENT FOR REMOVING INDENTATIONS IN TURF OR ON GOLF GREENS
Filed Feb. 3, 1969
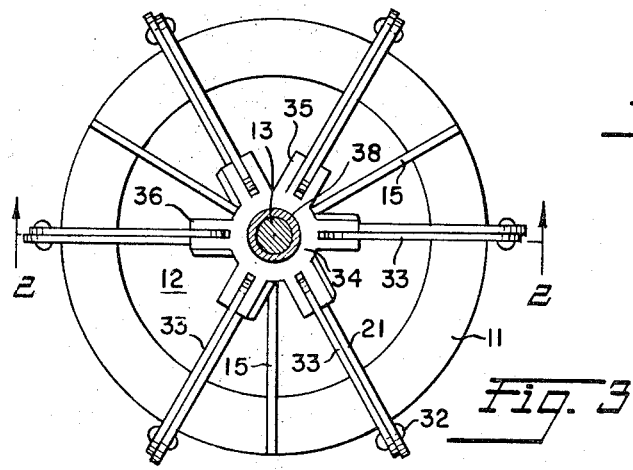
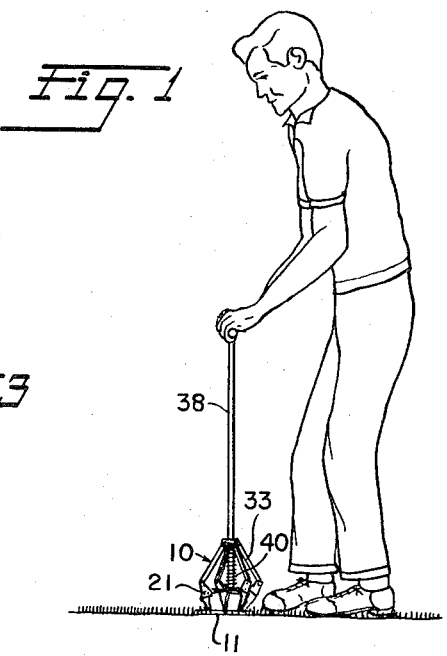
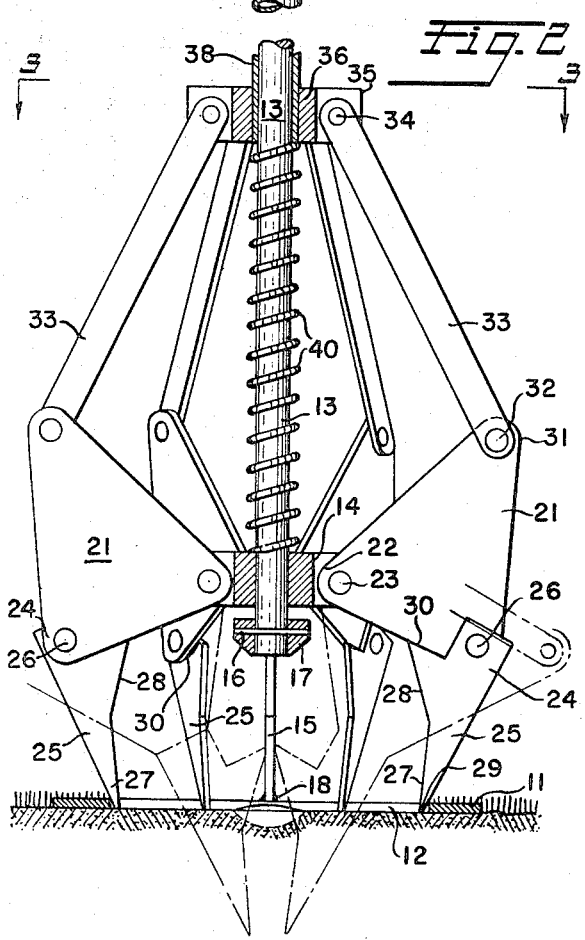
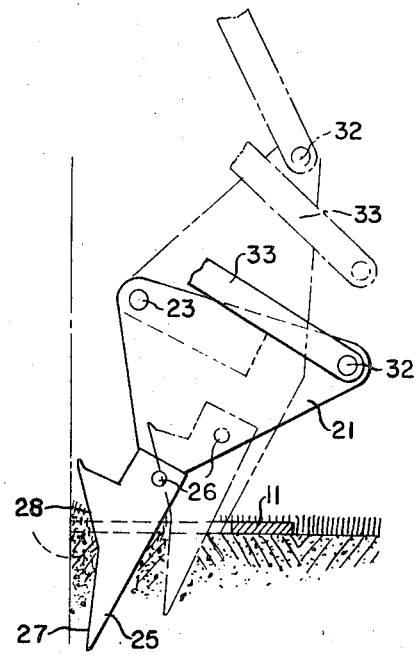
INVENTOR.
GLEN L. BABER
BY
Cameron Kerkam & Sutton
ATTORNEYS

United States Patent Office 3,567,264
Patented Mar. 2, 1971

3,567,264
IMPLEMENT FOR REMOVING INDENTATIONS
IN TURF OR ON GOLF GREENS
Glen L. Baber, Rte. 2, Chariton, Iowa 50049
Filed Feb. 3, 1969, Ser. No. 795,848
Int. Cl. A01b 1/16; A01d 9/06, 11/00
U.S. Cl. 294—50.7
10 Claims

ABSTRACT OF THE DISCLOSURE

This implement is designed to remove indentations from turf and ball marks from putting greens, by centering the implement over the indentations and by then pushing downwardly on the handle to move six angular blades downwardly and inwardly in a vertical position through the surface of the turf to converge about the indentation or ball mark, whereby the coaction of the blades about the indentation will relieve compaction of the earth, realign grass and grass roots and force the earth upwardly and inwardly thereabout to raise the turf and fill the indentation.

BACKGROUND OF THE INVENTION

The matter of removing deep indentations or ball marks from the surface of a golf green has been a long standing problem. Normally, a player on the green will use a tee or possibly a small pocket awl to dig under a ball mark and remove it from the surface of the green. Such makeshift means of eradicating ball marks leaves the surface of the green irregular and the turf torn and frequently result in brown or dead spots in the green and irregularities therein.

This invention is therefore designed to elevate the soil underneath and about the impression or ball mark in the green, to level the surface of the green and eradicate the mark, thus preserving the proper flat turf surface on the green.

In the past, a number of somewhat analogous instruments have been produced, none of which, however, have proven satisfactory and none of which properly eradicate the indentation or ball mark from the green. Thus, Coelho, Pat. No. 2,585,298 discloses a somewhat analogous implement including a vertical shaft with a pivoted actuating lever, which when pulled upwardly forces a lever system downwardly, thus turning spike members inwardly under the implement, under an indention in the green.

Good, Patent No. 2,869,915, discloses another embodiment of the concept in which a circular base ring is provided, on which are pivotally mounted arms provided with vertically disposed elongate pin members, the arms being affixed pivotally at their inner extremities to a spider disposed at the base of an actuating rod, whereby, when the rod is raised and the arms thus angularly elevated, the pins will converge inwardly under an identation.

These patents show somewhat the concept of the subject invention, but neither discloses or suggests certain novel features thereof, as will hereinafter be brought out in this specification.

SUMMARY OF THE INVENTION

As aforesaid, the concept behind the present invention is that of providing a base ring supporting the implement, through which six equally spaced, angular blades of narrow cross section may be forced downwardly within the ring into the surface of a green about a depression therein to loosen the compacted earth thereabout and to move it inwardly and upon completion of the downward stroke of the control member all six blades will converge in vertical position about the center of the ring and about the indentation in the green, to force the loosened earth upwardly and inwardly, thereby elevating the turf in the indentation and leveling it to the proper level of the surface of the green.

It is therefore a primary object of this invention to provide an improved instrument for removing indentations or ball marks from putting greens or analogous surfaces in which cooperating blades loosen the compacted earth and force it inwardly and upwardly about the indentation, to reelevate the turf and remove the indentation from the surface of the green, to restore the proper contour.

It is another object of this invention to provide such an implement which may be readily used by unskilled labor and which will operate rapidly and effectively properly to remove ball marks or indentations from turf.

It is another object of this invention to provide an implement which, when pressure on the actuating handle is relieved, will automatically retract its blades upwardly for ready removal of the implement to another location where repair is required.

Other and further objects of this invention will become apparent as this specification proceeds.

BRIEF DESCRIPTION OF THE DRAWINGS

Referring to the drawings, FIG. 1 is a perspective view of an operator placing the implement in position to remove a ball mark or indentation from a green or other turf surface;

FIG. 2 is a partial perspective view, partially in phantom, broken away and in vertical section, of the implement in position on the ground surface, with the blades in raised and lowered position;

FIG. 3 is a horizontal cross-sectional view of the lower, operating extremity of the implement, taken on line 3—3 of FIG. 2; and, FIG. 4 is a fragmentary view, partially broken away and in phantom, of one of the blades in progressively lowered position.

PREFERRED EMBODIMENT OF THE INVENTION

In the drawing, 10 designates the overall implement, which broadly comprises a flattened, circular base plate 11, provided with a central circular orifice 12, which is preferably mounted at right angles beneath the lower extremity of a cylindrical rod 13 by means of a spider 14 affixed about the lower extremity of the rod 13. Triangularly disposed legs 15, are affixed between spider 14 and base plate 11, thus maintaining base plate 11 in fixed position beneath spider 14, lying in a plane parallel to the plane of spider 14. Base plate 11 is preferably on the order of 8 inches in diameter and its central, circular orifice 12 is preferably on the order of 6 inches in diameter.

As aforesaid, circular base plate 11 is fixedly supported beneath spider 14 by means of three triangularly disposed legs 15, the upper extremities of which are fixedly attached by appropriate means to the outer periphery of spider 14. Fixedly mounted over the lower extremity of rod 13, by means of a pin 16, is a boss 17 provided with a flattened lower surface. The lower extremities of legs 15 are appropriately welded or otherwise affixed to the upper, flattened surface of plate 11, as by means of long welds 18, or by other appropriate means.

It will thus be seen that circular base plate 11 is maintained in fixed relationship beneath the spider 14 by means of triangularly disposed legs 15.

Spider bracket 14 is preferably provided with six outwardly extending arms 19, each of which is provided with a vertical slot 20, for a purpose hereinafter to be discussed. Arms 19 are preferably disposed at an angle of 60° to each other.

As the six blade units about to be described are identical, only one of such units will be described, like reference numerals applying to like elements in all blade units.

Thus, each blade unit comprises a generally triangular, vertically disposed blade head 21, which is pivotally mounted at its inner apex 22 in vertical slot 20 of arm 19 of spider 14 by means of an appropriate pin or bolt 23 passed through an appropriate bore in apex 22 of head 21 and appropriately affixed through arm 19.

At the outer, lower apex 24 of triangular head 21 there is mounted a blade 25, which is appropriately angularly affixed thereto by means of a rivet 26 passed through the lower apex 24 of head 21 and through an appropriate registering bore in the upper extremity of blade 25, whereby blade 25 may change its angular position with respect to head 21. It will be understood that blade 25 does not pivot freely on head 21 but that its connection thereto by means of rivet 26 is "stiff," permitting only moderate relative movement therebetween, as will be further discussed.

Blade 25 is preferably of reduced width and its inner surface, as shown, is preferably in the form of an obtuse angle of approximately 160°, defining lower blade surface 27 and upper blade surface 28, disposed, as indicated, at an angle of approximately 160° to each other. At its lower extremity blade 25 is reduced downwardly to an entering point 29.

At its upper, inner extremity, blade 25 is provided with a cut back, rectangular shoulder 30, which is bent inwardly, as shown, whereby shoulder 30 bears against the lower edge of blade head 21, as shown in FIG. 2. Shoulder 30 is provided for a dual purpose, as will hereinafter be more fully discussed, but its primary function is to maintain blade 25 in a proper angular attitude with respect to the lower edge of triangular blade head 21, when in raised position.

It will be noted, FIG. 2, that with heads 21 and blades 25 in elevated position, points 29 of blades 25 fall within orifice 12 of circular base plate 11, bearing closely against the inner walls thereof at their outer surfaces and being disposed flush with the lower surface of plate 11 at the periphery of orifice 12.

At their upper, outer apices 31, triangular heads 21 are pivotally affixed as by bolts or rivets 32 to the lower extremities of the elongate links 33, the position of which controls the relative position of triangular heads 21 and blades 25, with respect to base ring 11, as will be further discussed.

At their upper extremities, links 33 are pivotally mounted, as by bolts or rivets 34, in vertical slots in arms 35 of upper spider bracket 36, which corresponds in size and shape to lower, fixed spider bracket 14, the six arms 35 of spider 36 being vertically aligned with the arms of lower spider bracket 14, as shown in FIG. 3.

It will be understood, referring to FIG. 3, that the arms 35 of upper spider bracket 36 are disposed at 60° to each other about its periphery. Each of arms 35 is provided with a vertically disposed slot 37 for the pivotal reception of the upper extremity of control link 33.

As shown in FIGS. 2 and 3, upper spider bracket 36 is preferably fixedly mounted about the lower periphery of tube or sleeve member 38, which closely and slidably engages over the outer surface of rod 13, for vertical movement thereon, as will be discussed.

At is upper extremity, tube 38 is extended into a rectangularly disposed handle member 39, through which upward and downward movement may be applied to tube 38 and upper spider 36, on rod 13.

Disposed over rod 13, between upper spider bracket 36 and lower spider bracket 14 is an elongate helical spring 40, which, as shown in FIG. 2, when in fully extended condition applies resilient force between the upper surface of spider 14 and the lower surface of spider 36 to raise links 33, triangular heads 21 and blades 25 into elevated position, above the surface of the ground, as shown in FIG. 2.

It will further be seen that when downward pressure is applied to handle 39, forcing tube 38 and upper spider 36 downwardly on rod 13 toward circular base plate 11, which is seated firmly on the surface of the ground, spring 40 will be compressed and links 33, heads 21 and blades 25 will be forced downwardly with respect to base plate 11, the points 29 of blades 25 thus penetrating the surface of the ground adjacent the inner periphery of circular base plate 11, as blade heads 21 swing downwardly about their pivots 23. During the initiation of this movement shoulders 30 of blades 25 act as a bearing point for the blades against the lower surface of heads 21.

It will further be seen that as handle 39 is forced further downwardly, pivoting heads 21 downwardly about pivots 23, blades 25 will progressively penetrate deeper into the turf, about the indentation, as shown in FIG. 4, and will gradually be forced into vertical position about the indentation, as they pivot stiffly on rivets 26 connecting their upper extremities to the lower apices of heads 21. At the start of their downward penetration into the ground, the outer edges of blades 25 slidably bear or "cam" against the inner periphery of circular plate 11, thus the downward and inward movement of the lower apices 24 of heads 21 tends to force blades 25 into substantially vertical position, as they penetrate downwardly. As aforesaid, the connection between blades 25 and heads 21 by rivets 26 is a "stiff" connection and not a freely pivoting one, whereby, when heads 21 have swung downwardly about 30° blades 25 will have "swung out" from the lower apices of heads 21 and will have penetrated about ½ their length into the ground, or to about the apex of the obtuse angle between their upper and lower surfaces 28 and 27. Further downward, pivotal movement of heads 21 brings blades 25 into vertical position and then progressively moves all six blades inwardly about the periphery of the indentation, as shown in FIG. 2, with the upper blade surfaces 28 cooperating to force earth and turf into the indentation, about its periphery, and the lower blade edges 27 penetrating beneath the indentation to relieve compaction of the earth in that area.

Thus, as shown in FIG. 2, when the heads 21 have been pivoted fully to their lowest position, blades 25 will completely surround and contact the peripheral edges of the indentation in vertical position, restoring the indented area to its original state. It will also be noted that the movement of blades 25 through the turf will loosen compacted earth about the indentation and will leave six narrow slits therein, equally disposed about the periphery of the indentation, which permit ingress of water and fertilizer thereabout, to restore the area to its prior condition.

With the depression completely thus repaired, release of pressure on handle 39 will permit spring 40 to extend, thus forcing spider 36 upwardly on rod 13 and pulling blades 25 out of the ground into elevated position, as shown in FIG. 1, with their points 29 clear of the surface of the ground. Shoulders 30 at the upper, inner extremities of blades 25 prevent excessive inward swinging of blades 25, with respect to blade heads 21, on retraction, and maintain blades 25 in proper angular position therewith, in fully raised position, as shown in FIG. 2.

It will be understood that, as shown in FIG. 1, the manner of use of the implement is to center the orifice 12 of base plate 11 over the depression or ball mark in the green or turf, whereby the depression or ball mark is centrally disposed under spider 14 at the diametric center of circular base plate 11. With the implement so centered, and in vertical position, pressure is applied to handle 39, forcing points 29 of blades 25 downwardly and inwardly about the hemispherical depression in the green whereby the upper blade edges 28 move progressivly inwardly adjacent the depression to loosen compacted earth and the lower blade edges 27 move progressively inwardly beneath the depression, also loosening compacted earth and thereby forcing the adjacent and subjacent earth inwardly and upwardly beneath the depressed turf in the depression, to force the hemispherically depressed turf surface inwardly and upwardly into proper horizontal level with the surface of the green and removing the hemispherical depression therein.

Due to the angular surfaces 27 and 28 of the blades 25 compacted earth adjacent the depression is loosened and is moved upwardly and inwardly subjacent the hemispherical depression to elevate its depressed turf surface to proper ground level, from about its periphery and from beneath.

It will be further noted that due to the narrow width of blades 25 the cuts made in the surface of the turf thereby are negligible and substantially close, after removal of the blades therefrom. These cuts also act to aerate the green around the depression and the blades tend to loosen compacted earth and straighten bent grass roots.

When the depression in the green has been properly filled, as aforesaid, release of pressure on handle 39 allows spring 40 to extend, thus forcing upper spider 36 upwardly on rod 13 and elevating links 33, blade heads 21 and blades 25, until they attain the elevated position shown in FIG. 2, with their points 29 flush with the lower surface of base plate 11, bearing thereagainst and completely removed from the turf.

If the mark or indentation in the green is comparatively shallow, a partial penetration of blades 25 thereabout will normally eradicate it.

When the indentation is extreme, as when a ball has dropped from a height onto a wet or sodden surface, complete penetrtion of the blades is usually necessary to fully eradicate the deep depression in the turf of the green.

As aforesaid, the implement should be used in true vertical position, as shown in FIG. 1, and the depression in the green or other turf surface should be accurately centered in circular orifice 12 of base plate 11, under spider 14, before the handle 39 of the implement is forced downwardly to insert the points 29 of blades 25 into the turf about the depressed area.

As previously indicated, circular base plate 11 is preferably approximately 8 inches in diameter and its center orifice 12 is about 6 inches in diameter, thereby readily permitting flush positioning of base plate 11 on the surface of the green or other turf, about the depression, to provide a firm and stable base for the subsequent operation of the blades 25 as they penetrate the surface of the green about the depression.

It will further be noted that, referring to FIG. 2, as the handle 39 is progressively forced downwardly against spring 40 and heads 21 pivot, the outer surfaces of blades 25 slide or "cam" against the inner periphery of base plate 11, blades 25 thus being swung into vertical position as they penetrate the turf about the depression and then, in vertical position, as shown, being moved closely into position about the depression at 60° to each other about its periphery.

This specification is by way of illustration of a preferred embodiment of the invention and is not intended to limit the scope of the invention.

If desired, the number of links, triangular heads and blades may be varied and the size of the implement may be increased or decreased, depending upon the size of the depressions or indentations to be rectified thereby.

Throughout, equivalents may be substituted for all elements of the invention, without departing from the spirit thereof.

Attention is directed to the appended claims for a limitation of the scope of this invention.

What is claimed is:

1. In a device for eradicating depressions in turf, a central rod, a spider mounted about the lower extremity of said rod at 90° thereto, a circular flattened and centrally orificed base plate mounted beneath said spider on a plurality of legs affixed therebetween and lying in a plane parallel thereto, a plurality of equally spaced arms provided about the periphery of said spider, triangular blade heads pivotally mounted at their inner apices in said arms, angularly disposed blades affixed at the lower apices of said blade heads, extending downwardly therefrom, said blades being relatively thin and having inwardly directed cutting edges a cylindrical tube slidably mounted over said rod at its upper extremity, a handle at the upper end of said tube, a spider affixed to the lower extremity of said tube provided with a plurality of outwardly extending arms equal in number to the arms of the lower spider and vertically aligned therewith, links pivotally affixed at their upper extremities in the arms of said upper spider and pivotally affixed at their lower extremities to the upper apices of said triangular heads, a helical spring disposed about said rod between said upper and lower spiders providing spring pressure therebetween means positioning said blades within and in contact with said base plate to guide the blades as they penetrate the ground, whereby downward pressure on said handle will compress said spring between said spiders, forcing said links, triangular heads and blades downwardly for penetration of said blades into the surface of the ground within the central orifice of said circular base plate.

2. A device in accordance with claim 1 in which the arms on said spiders are six in number and are disposed at 60° angles to each other.

3. A device in accordance with claim 1 in which said blades are provided with sharpened lower extremities and in which the inner surfaces of said blades are disposed at about 160° to each other.

4. A device in accordance with claim 1 in which said circular base plate is supported beneath said lower spider in a plane parallel thereto by triangularly disposed legs extending therebetween.

5. A device in accordance with claim 1 in which the lower extremities of said blades are flush with the lower surface of said base plate when said spring is fully extended and said blades are in raised condition.

6. A device in accordance with claim 1 in which said blades are rectilinear on their outer surfaces and are divided into two obtuse angularly disposed edges on their inner surfaces.

7. A device in accordance with claim 1 in which the said circular base plate is on the order of 8 inches in diameter and the central orifice thereof is on the order of 6 inches in diameter.

8. A device in accordance with claim 1 in which said blades are riveted at their upper extremities to the outer apices of said triangular heads at an acute angle thereto and are not free-swinging with respect thereto.

9. A device in accordance with claim 1 in which said blades bear at their outer edges against the inner periphery of said circular base plate and progressively assume a vertical position as the triangular blade heads are swung downwardly, forcing the blades into the ground about the depression therein.

10. A device in accordance with claim 1 in which the blades are provided at their upper, inner extremities with a shoulder which bears against the lower edge of the blade head, in raised position.

References Cited
UNITED STATES PATENTS

| | | | |
|---|---|---|---|
| 1,548,865 | 8/1925 | Bull | 294—50.5 |
| 1,885,377 | 11/1932 | Robinson | 294—50.7 |

EVON C. BLUNK, Primary Examiner

D. D. WATTS, Assistant Examiner